May 2, 1961 A. F. BOSSONE 2,982,392
SAFETY KIT FOR MOTOR VEHICLES
Filed July 9, 1959 2 Sheets-Sheet 1
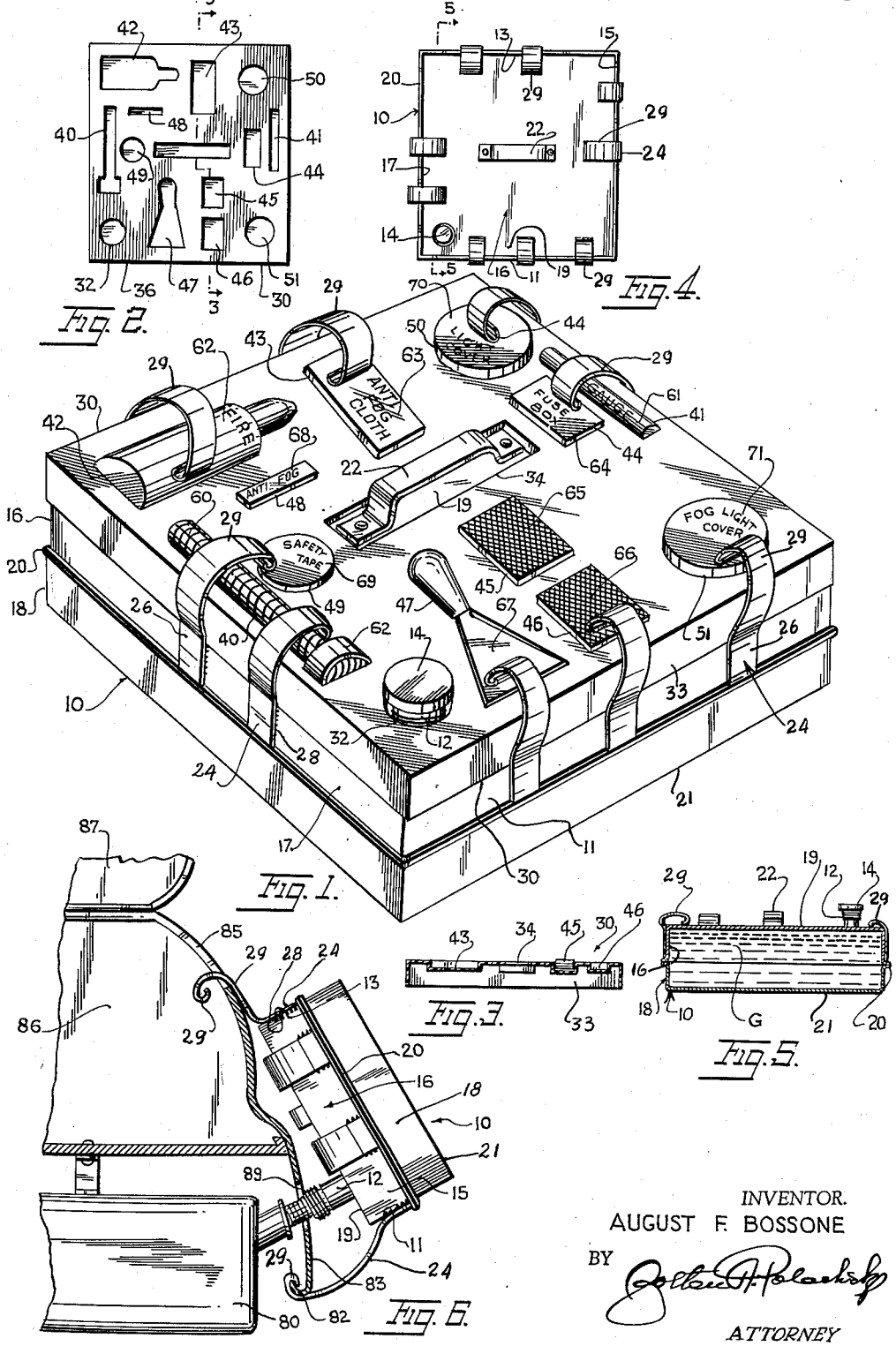
INVENTOR.
AUGUST F. BOSSONE
BY
ATTORNEY

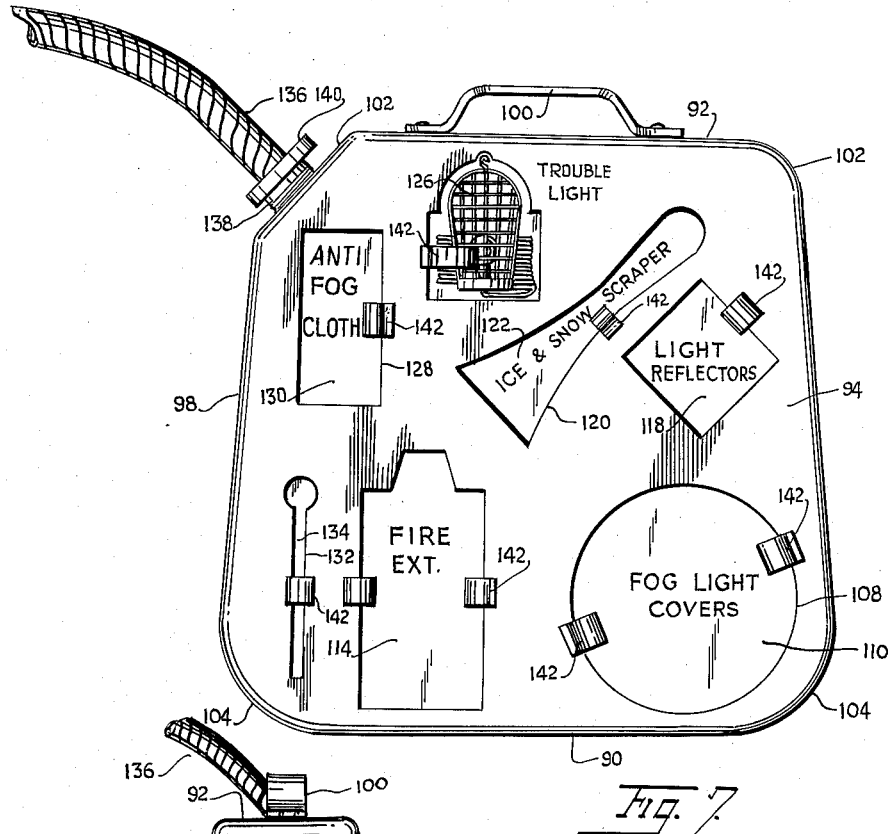
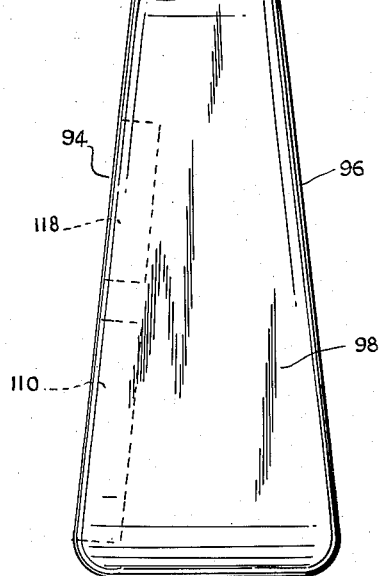

United States Patent Office 2,982,392
Patented May 2, 1961

2,982,392

SAFETY KIT FOR MOTOR VEHICLES

August F. Bossone, 10 Julliard Drive, Plainview, N.Y.

Filed July 9, 1959, Ser. No. 826,011

3 Claims. (Cl. 206—16)

This invention relates to a portable container for storing an emergency supply of gasoline in an automobile and more particularly to a combined gasoline container and support for accessories used by motorists.

The invention broadly comprises a portable rectangular sheet metal container for holding an emergency supply of gasoline and for holding a variety of accessories likely to be used by a motorist. The container is provided with clamps for clamping the container to a stationary part of the automobile while feeding gasoline to the fuel tank. The clamps serve to clamp in the accessories in position when not used for holding the container in operative position for feeding gasoline to the fuel tank.

A principal object of the present invention is to provide a container for an emergency supply of gasoline adapted to be readily carried in an automobile and to be readily attached to the inlet of a fuel tank of the automobile.

Another object of the invention is to provide a container for an emergency supply of gasoline having means for supporting a variety of accessories used during an automobile trip.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a fuel container and accessory support embodying the invention, with accessories shown in supported position.

Fig. 2 is a plan view of the cover of the container, on a reduced scale.

Fig. 3 is a vertical sectional view taken on the plane of the line 3—3 of Fig. 2.

Fig. 4 is a top plan view of the container with the cover removed.

Fig. 5 is a vertical sectional view taken on the plane of the line 5—5 of Fig. 4, showing gasoline in the container.

Fig. 6 is a side elevational view of the container with cover removed shown supported on a fragment of an automobile body in position to discharge gasoline into the fuel tank of the automobile, the automobile body being shown partly in section and partly in elevation.

Fig. 7 is a front elevational view of an emergency gasoline supply container and support for accessories embodying a modified form of the invention.

Fig. 8 is a side elevational view thereof, looking from the right of Fig. 7.

Referring in detail to the drawings, in Figs. 1 to 6, inclusive, there is shown a closed, shallow, rectangular-shaped box-like container 10 made in accordance with the invention. The container 10 comprises a shallow, rectangular-shaped box-like body made of sheet metal. The body is sectional with an upper section 16 and a lower section 18 joined by a peripheral seam 20. The body has a flat bottom wall 21, a flat top wall 19, and flat side walls 11, 13, 15 and 17. At one corner, the upper section 16 is formed with a spout 12 serving as an inlet and as an outlet for gasoline G. A screw cap 14 is removably fitted over the spout.

A plurality of spaced spring clamps 24 are supported in upright fashion on the side walls of the container. Each clamp is formed of a flat strip of metal having a flat end 26 fastened to the side wall by welding as indicated at 28 and having a curved end forming a hook 29 protruding upwardly above the top wall 19.

A cover 30 in the form of a plastic plate with an inwardly extending flange 33 is adapted to be slipped over the top wall 19 and upper ends of the side walls and underneath the clamps 24 as shown in Fig. 1. The body of the cover plate is perforated and indented forming a number of recesses of various shapes for removably supporting a variety of accessories used during a trip in an automobile. For example, there is an opening 32 to permit the spout 12 to extend upwardly therethrough, and an opening 34 to permit the handle 22 to extend above the cover.

There is a recess 40 provided for removably supporting a flexible gasoline filler tube 60 having a screw cap 62 adapted to screw on the end of spout 12 when cap 14 is removed therefrom. There is also provided a recess 41 for a tire gauge 61, a recess 42 for a fire extinguisher 62, a recess 43 for an anti-fog cloth 63, a recess 44 for a box of fuses 64, recesses 45 and 46 for road light reflectors 65 and 66, respectively for emergency use, a recess 47 for an ice scraper 67, a recess 48 for anti-fog silicone containing bar 68 for windows, a recess 49 for a roll of safety tape 69, and recesses 50 and 51 for two yellow light filters 70 and 71, respectively, adapted to fit over the headlights of the automobile for use in a fog. The accessories in the recesses along the side edges of the cover are held in position by the clamps 24.

In use, when it is desired to replenish the supply of gasoline in the fuel tank 80 of the automobile, the cover 30 with the supported accessories is removed from the top wall 19 of the container. This can be readily accomplished by holding the container at the seam 20 and pressing the cover 30 upwardly with a finger past the spring clamps 24. The cap 14 is then removed from the spout 12 and the filler tube 60 carried by the cover 30 attached to the spout. The body of the container is then inverted and the attached tube 60 inserted through the opening 89 above the fender 83 and into the inlet tube of the fuel tank 80 as shown in Fig. 6. At the same time the clamps 24 on opposed side walls of the body of the container are hooked over the beaded bottom long edge of the fender and over the edge wall of the opening 85 of the automobile trunk 86, the trunk door 87 being first opened for this purpose. Thus, the container 10 is held on the automobile body safely and without requiring the motorist to manually hold the same on. While the fuel tank is being filled, the motorist can place the road light reflectors 65 and 66 on the road and employ the other accessories to the best advantage.

Referring now to the modified form of emergency container and accessory support shown in Figs. 7 and 8, in this form the container has a substantially rectangular body with flat bottom wall 90, flat top wall 92, flat front wall 94, flat rear wall 96, and flat side walls 98, 98. The container is adapted to stand on the bottom wall 90. A handle 100 is provided at the center of the top wall 92. The side walls 98 are joined to the top wall 92 by a shoulder portion 102 and are joined to the bottom wall 99 by curved shoulders 104. In the shoulder portion 102 of one of the side walls 98, an opening is formed and is provided with an externally screw-threaded neck therearound. This opening serves as an inlet and outlet for a supply of gasoline in the container.

In accordance with the invention, the front wall 94 is indented forming a plurality of spaced recesses for supporting a variety of accessories needed by motorists. For example, there is a circular recess 108 for supporting fog light covers 110 for the headlights of the automobile. A rectangular-shaped recess is provided for a fire extinguisher 114. A rectangular-shaped recess is provided for a road light reflector 118, an elongated recess 120 for an ice and snow scrapper 122, an oval-shaped recess 124 for a trough light 126, a rectangular-shaped recess 128 for an anti-fog cloth 130 and an elongated recess 132 for a tire cutter 134.

The container is equipped with an elongated spout 136 having an internally screw-threaded annular body portion 138 adapted to be threaded over the neck portion of the container. The spout is formed with an annular handle 140 for manipulating the spout. In this form of the invention, the recesses are formed directly in the front wall 94 and the accessories are held in position by spring clips 142 secured to the front wall adjacent each recess and overhanging the recess. The neck portion of the container may be equipped with a cap when the spout 136 is not in use.

In using this form of container, the container is carried by the handle 100 and the spout 136 is inserted into the inlet tube of the fuel tank 80 and held therein until the supply is sufficiently replenished or until the supply in the container is exhausted. The spring clips 142 hold the accessories in the recesses but permit ready removal thereof when needed.

The invention thus provides the motorist in one convenient kit the essential accessories and supplies required in an emergency, including an emergency supply of gasoline and means to fill the fuel tank of the automobile safely and easily.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A safety kit for motorists, comprising a box-like container for an emergency supply of gasoline, a cover removably mounted on said container, said cover having a plurality of recesses, a plurality of accessories removably mounted in said recesses, one of said accessories being a filler tube adapted to be connected to said container for dispensing the gasoline therefrom, and means carried by said container holding the accessories in said recesses, said means comprising spring clamps attached to side walls of the container and yieldably engaged over said accessories on the cover, said container having an outlet opening with a threaded neck at the top thereof opening into the container, said filler tube having a threaded section adapted to screw on said neck for filling a gasoline tank, said spring clamps being flexible to hold the container on a vehicle body while gasoline is discharged from the container to the tank in the vehicle via the filler tube.

2. A container for an emergency supply of gasoline adapted for forming part of a safety kit for motorists, comprising a sheet metal closed box-like structure having top, bottom and side walls, an outlet opening with a neck formed on the top wall and opening into said structure, and a plurality of spring clamps attached to the side walls, said spring clamps being adapted to hold the container on an automobile body while the gasoline in the container is being discharged into the fuel tank of the automobile, each of said clamps having a coiled free end and an opposite end, the opposite end being welded to one of the side walls, there being a filler tube normally held on said container by certain of said spring clamps.

3. A safety kit for motorists, comprising a box-like container for an emergency supply of gasoline, a cover removably mounted on said container, said cover having a plurality of recesses, a plurality of accessories removably mounted in said recesses, one of said accessories being a filler tube adapted to be connected to said container for dispensing the gasoline therefrom into a gasoline tank of an automobile, and means carried by said container holding the accessories in said recesses, said means comprising spring clamps attached to side walls of the container and yieldably engaged over said accessories on the cover, said container having an opening with a threaded neck at the top thereof opening into the container, said filler tube having a threaded section adapted to screw on said neck, said container having a handle at the top thereof, said cover having a pair of openings therein, said handle and neck extending through said openings when the cover is on the container, each of said spring clamps having a coiled free end adapted to engage on a portion of an automobile body for holding the container on the automobile body while the filler tube is threaded on said neck and extends into the gasoline tank for filling the same.

References Cited in the file of this patent

UNITED STATES PATENTS

| | | |
|---|---|---|
| 390,089 | McClelland | Sept. 25, 1888 |
| 844,481 | Stewart | Feb. 19, 1907 |
| 1,071,662 | Burgener | Aug. 26, 1913 |
| 2,450,172 | Stoner | Sept. 28, 1948 |
| 2,649,606 | Fadner | Aug. 25, 1953 |

FOREIGN PATENTS

| | | |
|---|---|---|
| 535,631 | France | Jan. 27, 1922 |